United States Patent
Huber et al.

(10) Patent No.: US 12,071,171 B2
(45) Date of Patent: Aug. 27, 2024

(54) COUPLING ELEMENT FOR ATTACHING TO A LEADSCREW, LEADSCREW HAVING A COUPLING ELEMENT, SPINDLE DRIVE HAVING A LEADSCREW, AND STEERING COLUMN FOR A MOTOR VEHICLE HAVING A SPINDLE DRIVE

(71) Applicants: thyssenkrupp Presta AG, Eschen (LI); thyssenkrupp AG, Essen (DE)

(72) Inventors: Sebastian Huber, Göfis (AT); Jean-Pierre Specht, Haag (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 722 days.

(21) Appl. No.: 15/734,412

(22) PCT Filed: Jun. 18, 2019

(86) PCT No.: PCT/EP2019/066072
§ 371 (c)(1),
(2) Date: Dec. 2, 2020

(87) PCT Pub. No.: WO2019/243356
PCT Pub. Date: Dec. 26, 2019

(65) Prior Publication Data
US 2021/0171085 A1    Jun. 10, 2021

(30) Foreign Application Priority Data
Jun. 20, 2018    (DE) ............... 10 2018 210 045.4

(51) Int. Cl.
*B62D 1/181*    (2006.01)
*F16B 17/00*    (2006.01)
(Continued)

(52) U.S. Cl.
CPC ............ *B62D 1/181* (2013.01); *F16B 17/006* (2013.01); *F16H 25/20* (2013.01); *F16H 25/24* (2013.01);
(Continued)

(58) Field of Classification Search
CPC .............................. F16H 2025/2037
See application file for complete search history.

(56) References Cited

U.S. PATENT DOCUMENTS 2,511,806 A * 6/1950 Macy ............... H01R 13/04
439/877
2017/0015345 A1  1/2017 Galehr
(Continued)

FOREIGN PATENT DOCUMENTS

CH         57627 A    1/1913
CN       106232455 A  12/2016
(Continued)

OTHER PUBLICATIONS

English Translation of International Search Report issued in PCT/EP2019/066072, dated Sep. 17, 2019.

*Primary Examiner* — Vicky A Johnson
(74) *Attorney, Agent, or Firm* — thyssenkrupp North America, LLC (57) ABSTRACT

A coupling element for fitting to a threaded spindle. The coupling element has a receiving portion which is formed integrally with a coupling portion. The receiving portion extends in a hollow-cylindrical manner along an axis having an axial receiving opening for receiving the threaded spindle, and the coupling portion is flattened transversely with respect to the axis relative to the receiving portion and has a connection means. In order to be able to produce a coupling element in a more efficient and flexible manner, the receiving portion and the coupling portion be formed from a continuous integral pipe portion, wherein the coupling (Continued)

portion has a pressing portion in which the pipe portion is plastically compressed flat transversely relative to the axis.

3 Claims, 3 Drawing Sheets

(51) Int. Cl.
*F16H 25/20* (2006.01)
*F16H 25/24* (2006.01)

(52) U.S. Cl.
CPC ............... *F16H 2025/2037* (2013.01); *F16H 2025/2084* (2013.01); *F16H 2025/209* (2013.01)

(56) References Cited

U.S. PATENT DOCUMENTS

| | | |
|---|---|---|
| 2017/0097071 A1 | 4/2017 | Galehr |
| 2018/0134308 A1 | 5/2018 | Houser et al. |

FOREIGN PATENT DOCUMENTS

| | | | | |
|---|---|---|---|---|
| CN | 106458243 A | 2/2017 | | |
| CN | 108068875 A | 5/2018 | | |
| DE | 10 2007 041 100 A | 3/2009 | | |
| DE | 102007041100 A1 * | 3/2009 | ......... | F16H 25/2015 |
| DE | 10 2010 003 188 A | 9/2011 | | |
| DE | 10 2011 083 190 A | 3/2013 | | |
| DE | 102014101995 A1 * | 1/2015 | ............ | B62D 1/181 |
| DE | 10 2017 207 561 A | 7/2017 | | |
| WO | 2018/202672 A | 11/2018 | | |

* cited by examiner

Figure 12

COUPLING ELEMENT FOR ATTACHING TO A LEADSCREW, LEADSCREW HAVING A COUPLING ELEMENT, SPINDLE DRIVE HAVING A LEADSCREW, AND STEERING COLUMN FOR A MOTOR VEHICLE HAVING A SPINDLE DRIVE

CROSS REFERENCE TO RELATED APPLICATIONS

This application is a U.S. National Stage Entry of International Patent Application Serial Number PCT/EP2019/066072, filed Jun. 18, 2019, which claims priority to German Patent Application No. DE 10 2018 210 045.4, filed Jun. 20, 2018, the entire contents of both of which are incorporated herein by reference.

FIELD

The present disclosure generally relates to a coupling element for fitting to a threaded spindle.

BACKGROUND

Steering columns for motor vehicles have a steering shaft having a steering spindle to the rear end of which in the travel direction facing the driver a steering wheel for introducing a steering instruction by the driver is fitted. The steering spindle is rotatably supported about the longitudinal axis thereof in an adjustment unit which is retained by a carrier unit on the vehicle body. As a result of the fact that the adjustment unit is received in a covering unit which is connected to the carrier unit, also referred to as a guiding box or boxed swingarm, so as to be able to be displaced in the manner of a telescope in the direction of the longitudinal axis, a longitudinal adjustment can be carried out. A vertical adjustment can be carried out by the adjustment unit or a covering unit which receives it being pivotably supported on the carrier unit. The adjustment of the adjustment unit in the longitudinal or vertical direction enables the adjustment of an ergonomically comfortable steering wheel position relative to the driver position in an operating position, also referred to as the driver or operating position, in which a manual steering engagement can be carried out.

It is known in the prior art in order to adjust the adjustment unit relative to the carrier unit to provide a motorized adjustment drive with a drive unit which comprises an electrical adjustment motor which—generally by means of a transmission—is connected to a spindle drive which comprises a threaded spindle which is screwed into a spindle nut. As a result of the drive unit, the threaded spindle and the spindle nut can be rotatably driven with respect to each other about an axis, that is to say, the threaded spindle axis or spindle axis for short, whereby the threaded spindle and the spindle nut can be moved in translation toward each other or away from each other depending on the rotation direction in the direction of the threaded spindle axis. In an embodiment, the threaded spindle can be rotatably driven by the drive unit, which is fixedly connected to the adjustment unit or the carrier unit, about the spindle axis thereof and engages in the spindle nut which is fitted in a fixed manner to the carrier unit or alternatively to the adjustment unit with respect to rotation about the threaded spindle axis. In the direction of the spindle axis, the threaded spindle is supported on the carrier unit or the adjustment unit, and the spindle nut is accordingly supported on the adjustment unit or alternatively on the carrier unit so that a rotational drive of the threaded spindle brings about a translational adjustment of the carrier unit and adjustment unit relative to each other in the direction of the spindle axis. This embodiment is therefore also referred to as a rotation spindle drive.

In an alternative embodiment, the threaded spindle is coupled to the carrier unit or alternatively to the adjustment unit so as not to be able to be rotated with respect to rotation about the spindle axis thereof, and the spindle nut is rotatable, but supported in a fixed manner in the direction of the spindle axis accordingly on the adjustment unit or alternatively on the carrier unit. The spindle drive is supported in this instance on the carrier unit or the adjustment unit by means of a coupling element which is connected in a rotationally secure manner to the threaded spindle and the spindle nut accordingly on the adjustment unit or on the carrier unit so that the threaded spindle can be displaced in translation in the direction of the spindle axis by the spindle nut being rotatably driven by the drive unit about the spindle axis. This embodiment is also referred to as an immersion spindle drive.

As a result of the rotational drive of the spindle nut, a translational adjustment of the carrier unit and adjustment unit relative to each other in the direction of the spindle axis is brought about. In both embodiments, the spindle drive forms a motorized adjustment drive which is effective between the carrier unit and adjustment unit and by means of which the adjustment unit can be displaced for adjustment relative to the carrier unit, wherein the threaded spindle and the spindle nut can be moved in a motorized manner relative to each other (rotationally and translationally).

In order to produce a longitudinal adjustment of the adjustment unit in the direction of the longitudinal axis of the steering spindle, a spindle drive of an adjustment drive may be arranged between the adjustment unit and a covering unit which receives it axially in a longitudinally displaceable manner, also referred to as a guiding box or boxed swingarm, and which is connected to the carrier unit, and wherein the spindle axis can be orientated substantially parallel with the longitudinal axis. For height adjustment, a spindle drive may be arranged between the carrier unit and an adjustment unit or covering unit which is supported thereon so as to be able to be pivoted vertically and in which the adjustment unit is received. On a steering column, a motorized longitudinal and height adjustment can be formed individually or in combination.

For connection to the component of the steering column which is moved by the spindle drive, the threaded spindle has a coupling element which may be formed, for example, as a connection portion in the form of a joint head. Such a joint head may be produced by means of a corresponding processing of the threaded spindle itself, or also in the form of an initially separately produced coupling element which is securely fitted to an end of the threaded spindle, as described, for example, in the prior art for an adjustment drive for a steering column of a motor vehicle in DE 10 2017 207 561 A1. A separately provided coupling element which is subsequently secured to the threaded spindle is advantageous with respect to efficient and flexible production.

A known coupling element has as a functional element a sleeve-like or tubular receiving portion in which a free end of the threaded spindle can be received and secured, and a coupling portion, for example, a joint head which has a joint plate which is flattened relative to the receiving portion and which, for example, has a transversely continuous joint hole for articulated coupling to the steering column. In the prior art, the integral construction of such a coupling element is known, for example, as an extruded or compression-molded component which ensures a high degree of dimensional accuracy and rigidity. A disadvantage is the relatively high investment expenditure of the production and the high level of work complexity for modifications and adaptations, for example, with regard to dimensions, shaping and material.

Thus a need exists for a coupling element which can be produced in a more efficient and flexible manner, and a threaded spindle which is equipped therewith, a spindle drive having such a threaded spindle and a steering column for a motor vehicle which has such a spindle drive as an adjustment drive.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a coupling element for fitting to a threaded spindle, which coupling element has a receiving portion which is formed integrally with a coupling portion, wherein the receiving portion extends in a hollow-cylindrical manner along an axis having an axial receiving opening for receiving the threaded spindle, and the coupling portion is flattened transversely with respect to the axis relative to the receiving portion and has a connection means. The invention also relates to a threaded spindle having such a coupling element, a spindle drive having such a threaded spindle and a steering column for a motor vehicle which has such a spindle drive as an adjustment drive.

According to the invention, a coupling element of the type described in the introduction is characterized in that the receiving portion and the coupling portion are formed from a continuous integral pipe portion, wherein the coupling portion has a pressing portion in which the pipe portion is plastically compressed flat transversely relative to the axis.

The preferably hollow-cylindrical pipe portion forms a semi-finished product for construction of the coupling element according to the invention. The hollow-cylindrical pipe portion is preferably a circular-cylindrical pipe portion without deformations. In this instance, the cross-sectional shape and dimensions of the pipe portion are selected in such a manner that one end portion can act as a receiving portion of the coupling element. One free opening of the pipe portion acts with the preferably circular inner cross-section thereof as an axial receiving opening for receiving a free end of the threaded spindle. Alternatively, it is conceivable for the hollow-cylindrical pipe portion to have a polygonal cross-section and to be constructed, for example, as a square, hexagonal or octagonal pipe or the like.

In the other end region which faces away from the above-mentioned free opening of the pipe portion at one end, according to the invention the coupling portion of the coupling element (connection element) is formed by means of plastic deformation of the pipe portion. In detail, the tubular, hollow semi-finished product is compressed plastically in a shaping or pressing direction transversely relative to the axial direction until regions of the pipe wall which face each other internally with respect to the axis come into contact with each other and are plastically pressed flat against each other, whereby a pressing portion is produced and is substantially in the form of a flat plate. In this pressed flat state, the portions of the previous pipe wall which are now flat and which face each other in the pressing portion extend parallel with a plane, the so-called pressing plane, which is located parallel with the axis. In this instance, the pressing portion has a flat full cross-section whose thickness measured in the shaping direction, that is to say, normal with respect to the pressing plane, preferably substantially corresponds to double the wall thickness of the pipe wall. However, it is also possible to further deform the pressing portion beyond flat pressing, that is to say, to compress further plastically, so that the thickness of the pressing portion is smaller than double the wall thickness of the non-deformed pipe portion.

The coupling element is only compressed flat in the region of the pressing portion. As a result of the fact that the threaded spindle extends exclusively in the region of the receiving portion, and not in the pressing portion, the threaded spindle when the pressing portion is produced is not pressed or compressed flat. The pressing portion is formed exclusively by the walls of the pipe portion which have been compressed flat. As a result of the fact that only the pipe portion is plastically compressed flat, and not the threaded spindle, for the plastic deformation, a smaller pressing force is required to produce the pressing portion than for pressing the threaded spindle flat. As a result, the production complexity with regard to the prior art is reduced, wherein the threaded spindle is compressed flat even in the region of the coupling element. In this instance, a further advantage is that the pressing portion which is formed according to the invention only from the pipe portion may have a smaller mass than a portion of the threaded spindle which has been compressed flat.

As a result of a simple plastic deformation step, preferably by means of cold-forming, that is to say, the planar, flat compression of hollow or pipe material, the basic shape of the coupling portion can be produced in the pressing portion. The shaping energy which is required for this is considerably less than for a formation of the coupling portion and the molding of the receiving opening by means of massive forming from solid material, for example, a rod portion, or a portion of the threaded spindle. The shaping tools for compression can be produced by means of simple, planar pressing jaws which requires considerably less complexity than individually shaped dies for massive forming. The adaptation to the connection with a threaded spindle in the region of the receiving portion can be carried out in a simple manner by selecting the pipe material, which can be provided as a standard product, in particular also in different materials, such as steel, high-grade steel, non-ferrous heavy metal or the like. The processing of different materials is according to the invention also readily possible since only a relatively simple shaping operation is required to produce the pressing portion by means of compression.

The coupling element may have steel, non-ferrous heavy metal, such as, for example, brass, bronze, red brass or the like, additionally or alternatively a plastics material. As a result of the selection of the material, different material-specific properties for the function of the coupling element according to the invention can be used in order to functionally optimize it. For example, as a result of the plastic and resilient deformability, the retention effect on the threaded spindle and/or the impact behavior can be adjusted.

In a preferred embodiment, the coupling portion of a coupling element which is formed from a thermoplastic plastics material, which coupling portion is formed as a pressing portion, can be compressed flat thermally by means of hot-forming or hot-pressing. Alternatively, this can also be carried out by means of ultrasound heating using a sonotrode. Using thermal joining methods, a coupling element formed from plastics material can be fixed to the threaded spindle in a manner bonded substance-to-substance, for example, by means of ultrasonic or friction welding.

Preferably, the coupling element may comprise a resilient element. The resilient element may be achieved by using resiliently deformable material, such as an elastomer material, plastics material or a cork. For example, an elastomer material which is deformable in a rubber-like manner can be used. A damping when the coupling element strikes a counter-stop in order to limit the displacement path can thereby be produced.

The resilient material may be partially applied, for example, as a coating or attached stop member. For example, the coupling element may have a metal base member which comprises the receiving portion and the coupling portion and which is connected to a resilient portion of a softer plastics material or rubber material, for example, a continuous or partial coating.

The pipe portion for producing the coupling element may preferably be cut to length from a hollow-circular-cylindrical pipe without pre-deformations, wherein the length in the axial direction can substantially correspond to the length of the receiving portion plus the length of the coupling portion. It is alternatively conceivable and possible for the pipe to have a different cross-sectional shape, for example, square, hexagonal or polygonal, or oval, equilateral or non-equilateral.

For connection to a component which is intended to be coupled to the threaded spindle, a connection means may be formed in the pressing portion which has been compressed flat, for example, a connection opening which extends transversely relative to the axis and pressing plane and which, for example, may be constructed as a hole and can act as an articulation opening. The hole can be introduced both by means of a cutting operation and by means of a separating operation, such as punching. Alternatively or additionally—as a result of cutting or preferably non-cutting processing—positive-locking elements can be introduced into the pressing portion, such as, for example, projections, recesses, folds or edges, beads or the like.

For securing in an axial direction and in a peripheral direction on the threaded spindle, the inner diameter of the pipe portion may be of the same size or slightly smaller than the outer diameter of the threaded spindle, for example, the thread outer diameter in the end region of the threaded spindle which is intended to be connected to the coupling element. As a result of axially pressing the threaded spindle into the receiving opening of the receiving portion, a non-positive-locking connection can be produced. Alternatively, the coupling element can be joined by means of a screw movement on the threaded spindle, that is to say, by means of a rotational and axial movement in an axial direction, the joining operation can be carried out. Alternatively or additionally, a positive-locking fixing can be carried out, for example, by means of plastic deformation of the receiving portion on the threaded spindle, whereby positive-locking structures which preferably engage inside each other in a non-releasable manner can be produced. Such positive-locking structures may, for example, be produced by means of one or more indentations which are locally formed from the outer side in the pipe portion and which extend over a part-region of the pipe periphery. This operation can also be referred to as a caulking or as crimping or crimp-connecting. At the inner side thereof which is directed from the outer side against the threaded spindle, the pipe portion can thereby be plastically formed in the threaded spindle, for example, also in the thread turns of the spindle thread, so that a positive-locking tooth arrangement is produced between the coupling portion and the threaded spindle. An indentation may extend over a part-portion in a longitudinal direction, in an axial direction in order to produce a positive-locking connection which is effective in an axial direction and/or over a part-periphery in order to produce a positive-locking connection of a rotationally secure connection effective in a peripheral direction.

Preferably, the pressing portion has in a contact face pipe wall portions which lie against each other. As a result of the compression, the pipe is deformed flat parallel with the contact face until the inner portions which face each other internally at both sides of the axis meet in the contact face and together form a coupling portion which is planar in its basic form, for example, in the form of a flat plate. Consequently, as a result of the compression, the inner covering face of the pipe portion comes partially into contact with itself so that the contact faces represent a portion of the inner covering face of the pipe portion.

The axis may be located in the contact face. A symmetrical, coaxial arrangement is thereby formed in which the axis extends centrally through the coupling portion and consequently between the pipe wall portions which lie against each other as a result of the compression.

As an alternative to the above-mentioned embodiment, it is conceivable and possible for the contact face to have spacing with respect to the axis, whereby an asymmetrical arrangement is formed.

Preferably, the pressing portion has two outer faces which are parallel with the axis. There is thereby formed a flat coupling portion which extends as a flat profile in an axial direction away from the receiving portion. The outer faces of the pipe wall portions which have been deformed flat against each other by the compression are substantially planar and face each other with respect to the axial direction.

It is possible for the axis to be located in one of the outer faces. An asymmetrical arrangement can thereby be produced, in which the coupling portion extends in a state offset with radial spacing relative to the axis. The axis thereby extends outside the above-mentioned contact face, in which the deformed pipe wall portions lie against each other.

There may be provision for one of the outer faces to extend tangentially with respect to the receiving portion. The introduction of force into the threaded spindle can thereby be optimized and structural space for securing means in the cross-section of the receiving portion can be provided.

Preferably, the pressing portion has in a direction measured transversely relative to the axis a thickness which is smaller than a diameter of the receiving portion, preferably smaller than the outer diameter of the receiving portion, wherein this outer diameter preferably corresponds to the outer diameter of the pipe portion prior to the compression of the coupling portion which is formed as a pressing portion. The thickness corresponds to the spacing between the outer faces of the coupling portion in the pressing direction of the compression. Preferably, the thickness of the coupling portion is less than or equal to double the wall thickness of the wall of the pipe portion. Alternatively, there may also be provision for the coupling portion to have a thickness which is a maximum of 10% greater than double the wall thickness.

The pressing portion may have a width in one direction which is greater than a diameter of the receiving portion, preferably greater than the outer diameter of the receiving portion, wherein this outer diameter preferably corresponds to the outer diameter of the pipe portion prior to the compression of the coupling portion which is formed as a pressing portion. The width extends in this instance transversely relative to the axis and transversely relative to the thickness. By means of simple flat compression, a width which corresponds at the most to half the mean periphery of the pipe wall of the pipe portion is produced.

The connection means may comprise a connection opening which extends transversely relative to the axis through the pressing portion. The coupling portion thereby obtains the shape of a flat articulated plate, wherein the connection opening represents an articulation opening for receiving a joint pin in order to connect the threaded spindle to a steering column in an articulated manner so as to be able to be pivoted about the joint pin. The joint pin may in this instance preferably be produced as a screw or a rivet.

Preferably, the pipe portion has prior to the compression a wall thickness which is identical over the periphery and over the length.

A method for producing a coupling element, which has a receiving portion which is formed integrally with a coupling portion, wherein the receiving portion extends in a hollow-cylindrical manner along an axis having an axial receiving opening for receiving the threaded spindle, and the coupling portion is flattened transversely with respect to the axis relative to the receiving portion and has a connection means, comprises according to the invention the steps of:

providing a pipe portion,
plastic deformation of an end region of the pipe portion transversely relative to the axis thereof by compressing between pressing tools which are moved with respect to each other and which extend in a planar manner in order to form a flat pressing portion,
introducing a connection means in the pressing portion.

The pipe portion may be provided by cutting to length standard pipe or hollow material at a length which substantially corresponds to the sum of the lengths of the receiving and coupling portion. Preferably, the length of the pipe portion prior to compression is greater than the sum of the lengths of the receiving portion and the coupling portion. The hollow-cylindrical pipe material, preferably a hollow-circular-cylindrical pipe material, may have a circular or a square, hexagonal or polygonal or oval cross-section which is in this instance equilateral or non-equilateral. One end region—preferably by means of cold-forming—is compressed flat between two pressing tools, for example, flat pressing jaws, preferably until the inner walls of the pipe portion are in contact at least in regions, preferably in a contact plane. The above-described flat pressing portion is thereby formed. In order to produce the coupling portion, a connection means is introduced, for example, by means of punching or drilling a connection or articulation opening which extends transversely relative to the axis. An articulated plate or the like for connection to a steering column can thereby be formed.

The term "between pressing tools which are moved with respect to each other and which extend in a planar manner" is intended to be understood to mean that the pressing tools move relative to each other.

The other end region of the pipe portion can initially remain undeformed. The opening of the open pipe end extends as far as the pressing portion, and thus forms a pot-like blind opening.

The length of the receiving portion, the part of the pipe portion which has not been compressed flat, is preferably selected in order to enable securing to an end of a threaded spindle. Preferably, the length of the receiving portion is at least equal to the outer diameter of the pipe portion, or greater than the outer diameter of the pipe portion.

The length of the pressing portion and the coupling portion which is formed therefrom can be adapted to the connection means. Preferably in this instance, a length is at least equal to the outer diameter of the pipe portion, or greater than the outer diameter of the pipe portion.

The pressing tools preferably comprise a lower pressing tool and an upper pressing tool, wherein the upper pressing tool preferably moves toward the lower pressing tool which is formed as an abutment, wherein the lower pressing tool is non-movable. An arrangement vice versa is also conceivable and possible. In addition, lateral sliding members can be used and bring the width of the pressing portion to a predetermined shape during compression. Alternatively, there may also be provision for the pressing portion to freely develop during compression.

Alternatively, the pressing tools can be formed by a roller and a counter-bearing, wherein these members have a spacing with respect to each other which corresponds to the thickness of the pressing portion which is intended to be produced, wherein the pipe portion is introduced between the roller and the counter-bearing for plastic deformation of an end region of the pipe portion transversely relative to the axis thereof by means of compression in order to form a flat pressing portion. The rotation axis of the roller is preferably arranged orthogonally to or parallel with the axis of the pipe portion.

In a specific development, the counter-bearing can also be constructed as a roller.

Alternatively, a method for producing a coupling element, which has a receiving portion which is formed integrally with a coupling portion, wherein the receiving portion extends in a hollow-cylindrical manner along an axis having an axial receiving opening for receiving the threaded spindle, and the coupling portion is flattened transversely with respect to the axis relative to the receiving portion and has a connection means, comprises according to the invention the steps of:

provide a pipe portion, plastic deformation of a central region of the pipe portion transversely relative to the axis thereof by compression between pressing tools which are moved with respect to each other and which extend in a planar manner in order to form a flat pressing portion, introducing a first connection means and a second connection means into the pressing portion, separation between the connection means in the region of the flat pressing portion in order to obtain two coupling elements.

Consequently, in a simple and cost-effective manner, two coupling elements can be produced at the same time. Preferably, the separation is a halving of the intermediate product, wherein the separation is preferably carried out along a section axis which is orthogonal to the axis.

The pipe portion may be provided by cutting to length standard pipe or hollow material at a length which substantially corresponds to double the sum of the lengths of a receiving and coupling portion. Preferably, the length of the pipe portion prior to compression is greater than twice the sum of the lengths of a receiving portion and a coupling portion.

All the above-described possible modifications can be readily transferred to this method.

With a threaded spindle for a spindle drive, in particular an adjustment drive which is constructed as an immersion spindle drive, in particular for adjusting a steering column, which has an outer thread, and to which there is secured a coupling element described above having a receiving portion which is formed integrally with a coupling portion, wherein the receiving portion extends in a hollow-cylindrical manner along an axis having an axial receiving opening in which a securing portion of the threaded spindle is coaxially received and the coupling portion is flattened transversely with respect to the axis relative to the receiving portion and has a connection means, there is provision according to the invention for the receiving portion and the coupling portion to be formed from a continuous, integral pipe portion, wherein the coupling portion has a pressing portion in which the pipe portion is plastically compressed flat transversely relative to the axis.

The securing portion of the threaded spindle may be formed by an end portion of the threaded spindle, wherein the securing portion of the threaded spindle also has the outer thread.

A threaded spindle according to the invention has a coupling element which is produced in the manner described on a pipe portion and which is connected to the threaded spindle. The production of the threaded spindle can thereby be carried out in a simpler and more cost-effective manner and an adaptation to different structural forms of steering columns is possible with less complexity.

For connection to the threaded spindle, the coupling element may have in the receiving portion at least one partial plastic deformation. The plastic deformation may preferably be secured connected to the outer thread of the threaded spindle.

The at least one partial deformation forms a securing region which is produced by means of a plastic shaping of a part-region of the receiving portion. A part-region may be a peripheral part-region, with respect to the periphery of the threaded spindle, and/or a length part-region which extends in an axial direction with respect to the axial length of the receiving portion in which it surrounds a portion of the threaded spindle, preferably a thread portion of the outer thread of the threaded spindle. For example, in a peripheral and/or longitudinal portion of the receiving portion, there can be carried out a shaping operation, by means of which the material of the receiving portion—for example, a metal material, such as steel or a non-ferrous metal—flows locally and a permanent shape change is produced. Preferably, the shape change can be produced by means of a cold-forming process, such as, for example, pressing, rolling, stamping, roller-burnishing, hammering or the like. Consequently, the shape change produces one, preferably a plurality of local deformations, which define separate functional regions or portions on or in the receiving portion in which a fixed joint connection to the threaded spindle is produced locally in each case.

As a result of the local shaping, to some degree as a result of the deformations, a type of integrated connection or securing element is formed on or in the receiving portion. With a relatively lower joining force, a good retention action of the receiving portion on the threaded spindle can be achieved.

In a preferred embodiment, a coupling element which is formed from plastics material can be fixed to the threaded spindle by means of partial deformations brought about by hot-caulking or hot-pressing. Alternatively, this may also be carried out by means of ultrasound heating with a sonotrode. Using this thermal joining method, the coupling element which is formed from plastics material can be fixed to the threaded spindle in a manner bonded substance-to-substance, for example, by means of ultrasonic or friction welding. In this instance, there may be provision for the plastics material to flow at least partially into the thread turns of the threaded spindle and to consequently adapt to the outer contour of the threaded spindle.

One or more partial deformations may be introduced into the receiving portion, for example, by means of cold-forming methods, if the receiving portion is arranged on the threaded spindle.

A plastic deformation may be directed against the outer thread so that it comes into joining contact with the outer thread. During the plastic deformation, for example, by means of a cold-forming method, the material of the receiving portion flows from the outer side against the threaded spindle in an outer thread part-portion, which faces the part-region of the receiving portion shaped by the deformation. For example, the receiving portion can be shaped with respect to the spindle axis in a radial direction, for example, by means of a shaping which is introduced from the outer side into the receiving portion and which produces an inwardly formed deformation, which in this instance is brought into joining contact with the outer thread with at least one radial component.

A deformation can preferably be connected in a positive-locking manner to a plastic deformation of the outer thread, which is formed by a permanently deformed region of the outer thread which deviates from the original thread shape, for example, a local recess which is delimited in a peripheral direction and/or longitudinal direction in the thread profile. As a result of the fact that the deformation of the receiving portion engages in the deformation of the outer thread, a positive-locking engagement is produced and can extend over a peripheral and/or longitudinal part-region and thereby locks the receiving portion securely in a positive-locking manner to the threaded spindle with respect to rotation about the spindle axis and/or axially with respect to movement in the direction of the spindle axis. In other words, a deformation of the receiving portion and a corresponding deformation of the outer thread form in each case a non-releasable positive-locking connection.

The high level of retention action enables a reliable introduction of force into the threaded spindle, for example, also in the event of a vehicle crash, when particularly high force peaks occur and also act on the adjustment drives of the steering column. An increase of the safety level is thereby brought about.

Preferably, the deformation of the receiving portion and the corresponding deformation of the outer thread of the threaded spindle are produced by means of cold-forming. This can be achieved in that, when the deformation is produced, such high shaping forces are introduced that the deformation is pressed into the threaded spindle and is in this instance plastically formed so that a negative impression of the deformation in the outer thread is produced. It is advantageous here that the deformation and the shaping are combined with each other in a practically play-free combined positive-locking and non-positive-locking connection. A high retention force is thereby achieved, wherein undesirable generation of noise as a result of relative movement in the play can be effectively prevented.

An advantageous embodiment of the invention makes provision for the tubular receiving portion to have an opening with an inner diameter which is greater than or equal to the outer diameter of the outer thread, wherein the deformation protrudes in a part-region over the inner diameter inward into the through-opening. Prior to assembly on the threaded spindle, that is to say, in the state not secured to the threaded spindle, the receiving portion has a free opening which can be pushed in an axial direction onto the threaded spindle. In this instance, the threaded spindle extends only in the region of the receiving portion and not in the region of the pressing portion. As a result of the fact that the free passage cross-section is greater than the outer thread nominal diameter, the receiving portion can be positioned on the outer thread before the joint connection is produced without plastic deformation, chip formation or friction occurring. The precise positioning is thereby facilitated and there are no occurrences of potentially harmful contamination as a result of chips or abraded particles.

A deformation can in each case be formed by means of a reshaping or molding introduced from the outer side into the receiving portion. In the initially undeformed receiving portion, in order to produce the joint connection one or more deformations can be carried out by pressing or stamping a pressing tool which is moved in a radial direction into the outer covering face, or by means of a burnishing roller which when rolled in an axial or peripheral direction or obliquely relative thereto rolls a recess from the outer side into the sleeve. The sleeve is thereby locally deformed radially inward at the inner face thereof lying against the outer thread and pressed against the thread or pressed therein in a positive-locking manner with plastic deformation.

A deformation may extend over a peripheral part-portion and/or a longitudinal part-portion of the receiving portion. For example, a peripheral part-region can be shaped by pressing or roller-burnishing a recess which extends in an axial direction in order to form a deformation, or a longitudinal part-region with an indentation which extends in a peripheral direction. It is also possible to shape a part-region which is delimited in a peripheral and axial direction in order to form a deformation, for example, by means of radially pressing in a pressing tool.

A plurality of deformations may be arranged in a state distributed over the receiving portion. For example, two, three or more recesses may be plastically formed in a state distributed in a peripheral direction from the outer side in the receiving portion or with axial spacing from each other one after the other in an axial direction.

In a spindle drive, in particular for an adjustment drive for adjusting a steering column, comprising a rotatably drivable spindle nut in which there engages a threaded spindle which is of the type described above and which has an outer thread and to which there is secured a coupling element with a receiving portion which is formed integrally with a coupling portion, wherein the receiving portion extends in a hollow-cylindrical manner along an axis with an axial receiving opening, in which a securing portion of the threaded spindle is coaxially received, and the coupling portion is flattened transversely with respect to the axis relative to the receiving portion and has a connection means, there is provision according to the invention for the receiving portion and the coupling portion to be formed from a continuous, integral pipe portion, wherein the coupling portion has a pressing portion in which the pipe portion is plastically compressed flat transversely relative to the axis.

As a result of the threaded spindle which is provided with a coupling element according to the invention, a spindle drive can be provided with little complexity and can be adapted in a flexible manner to different requirements.

As a result of the fact that the threaded spindle extends also in the region of the receiving portion, and not in the pressing portion, a smaller mass of the coupling element can advantageously be produced.

With a steering column for a motor vehicle having a carrier unit which can be fitted to a vehicle body and by which there is retained an adjustment unit in which a steering spindle is rotatably supported, and having an adjustment drive which is arranged between the carrier unit and the adjustment unit and by which the adjustment unit can be displaced relative to the carrier unit, wherein the adjustment drive is constructed as a spindle drive, comprising a rotatably drivable spindle nut in which there engages a threaded spindle which has an outer thread and on which there is secured a coupling element with a receiving portion which is formed integrally with a coupling portion, wherein the receiving portion extends in a hollow-cylindrical manner along an axis having an axial receiving opening in which a securing portion of the threaded spindle is coaxially received, and the coupling portion is flattened transversely with respect to the axis relative to the receiving portion and has a connection means, there is provision according to the invention for the receiving portion and the coupling portion to be formed from a continuous, integral pipe portion, wherein the coupling portion has a pressing portion in which the pipe portion is plastically compressed flat transversely relative to the axis.

The production complexity can thereby be reduced.

In an advantageous development, in the event of a crash when the vehicle, for example, has a front-end impact, there may be provision for the coupling element to be separated from the threaded spindle. In this instance, at least a portion of the energy introduced can be absorbed, with it being converted into deformation work. That is to say, the coupling element and the threaded spindle are torn apart in the event of a crash, wherein both the coupling element and the threaded spindle are at least partially plastically deformed.

Alternatively, with a coupling element for fitting to a threaded spindle, which coupling element has a receiving portion which is formed in one piece, preferably integrally in one piece, with a coupling portion, wherein the receiving portion extends in a hollow-cylindrical manner along an axis having an axial receiving opening for receiving the threaded spindle, and the coupling portion is flattened transversely with respect to the axis relative to the receiving portion and has a connection means, there may be provision according to the invention for the receiving portion and the coupling portion to be formed from a continuous, integral metal sheet portion, wherein the receiving portion has a pipe portion in which the metal sheet portion is bent over in a tubular manner about the axis.

In the alternative embodiment, a tubular semi-finished product as in the first embodiment of the invention is not taken as a basis but instead a flat material in the form of a sheet portion. The sheet portion may comprise metal or non-metal materials, for example, also plastics material. The term "flat material" is generally intended to be understood to mean that no spatial region is completely surrounded by the sheet portion prior to bending.

The coupling portion may be formed by a flat portion of the sheet portion. As described above for the first embodiment, this may have a connection opening in the form of a hole or punched portion.

In order to form the receiving portion of the receiving portion, the sheet portion may initially be shaped to form a pipe portion. This can preferably be bent over in the form of an open channel which has two securing tabs. The securing tabs extend along the channel and protrude from the edges of the channel transversely relative to the longitudinal extent so that between the two securing tabs a free access to the channel remains.

For securing, the threaded spindle is placed transversely relative to the spindle axis between the securing tabs into the pre-shaped channel so that the spindle axis extends in the longitudinal direction in the channel. Subsequently, the securing tabs can be bent over in a tubular manner around the outer periphery of the outer thread of the threaded spindle.

The production of the coupling portion can be carried out by means of punching and pressing operations from sheet metal in an efficient and cost-effective manner.

The fixing can be carried out by means of crimping or crimp-connecting. In this securing method, the securing tabs after bending are pressed from the outer side against the threaded spindle, preferably against the outer thread of the threaded spindle, so that the sheet material, with plastic deformation, preferably also with simultaneous plastic deformation of the outer thread, is connected to the threaded spindle and a positive-locking connection is formed. That is to say, the receiving portion is crimped on the outer thread. As a result of the flowing of the material which occurs in the sheet metal and in the thread during crimping, a permanent, non-releasable and secure connection can be produced with relatively little complexity. In order to further improve the connection, there may be provision for the securing tabs to be connected to each other after the shaping operation by means of a welding operation, in a particularly preferred manner by means of a laser welding operation.

It is further conceivable and possible for a functional element of an energy absorption device to be formed integrally with a coupling element which is formed from an integral pipe portion or an integral sheet portion. A functional element may, for example, be a deformation element which, in the event of a relative movement of an adjustment drive relative to the steering column in the event of a crash with energy absorption of kinetic impact energy, either itself becomes plastically deformed or brings about an energy-absorbing deformation of another element. For example, an expansion element in the form of a mandrel, wedge or the like may be formed on the pressing portion or the coupling portion. The expansion element can in the event of a crash, for example, be forced over a crash path along the longitudinal axis of the steering column through a slot which is undersized relative to the expansion element and which is in this instance plastically expanded with energy absorption. Other forms of energy absorption elements known per se, for example, tear-off flaps or bending flaps or combined tearing/bending elements, may be formed integrally with the pipe portion or the integral sheet portion. There may also be provision for the functional element as an abutment to engage in a crash element, such as a bending wire, wherein this crash element is supported on the functional element in the event of a crash.

Figure 1:
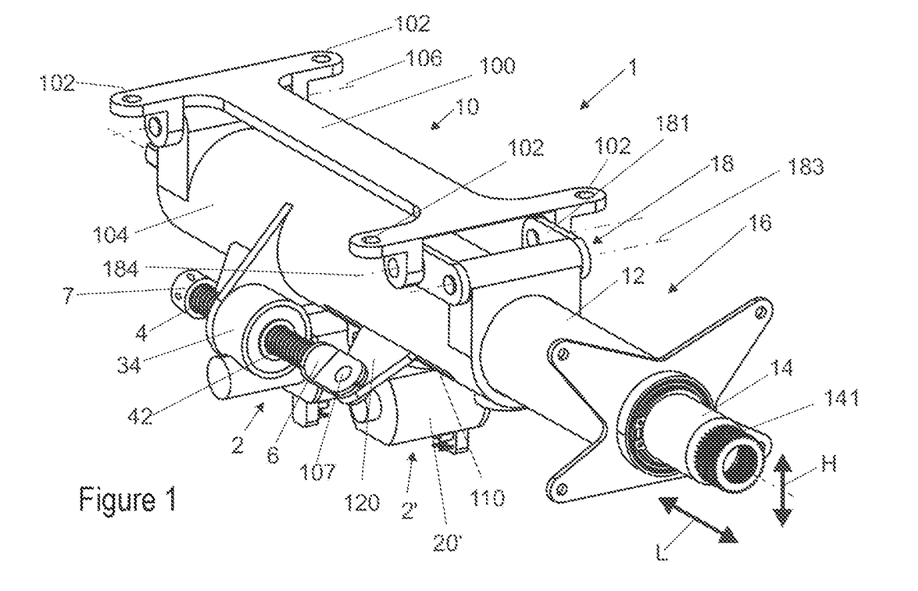
FIG. 1 is a schematic, perspective view of a steering column with a motorized adjustment.

FIG. 1 shows a steering column 1, which has a carrier unit 10 which can be connected to the chassis of a motor vehicle, which is not shown in this instance, and on which an adjustment unit 16 is adjustably retained, in the longitudinal direction L and in the vertical direction H, as indicated with the double-headed arrows. The carrier unit 10 comprises a console 100, which can be secured to the chassis of the motor vehicle, for example, by means of securing holes 102.

The adjustment unit 16 comprises a covering pipe 12 in which a steering spindle 14 is rotatably supported. At the end 141 of the steering spindle 14 on the steering wheel side, a steering wheel which is not shown in this instance can be secured. The steering spindle 14 serves to transfer a steering torque which is introduced by a driver via the steering wheel onto the steering spindle 14 in a known manner to a steerable wheel which is not shown in this instance. The steering spindle 14 may in this instance transmit the steering movement from the steering wheel to the steerable wheel with a steering gear being interposed, where applicable with the assistance of an auxiliary force support.

In a variant, the steering movement of the steering spindle 14 can also be detected using a sensor, for example, electrically, electronically or magnetically, and introduced into a control unit which with the assistance of a steering device carries out a pivoting of the steerable wheel in order to constitute the steering movement. Such systems are known as steer-by-wire steering systems.

The covering pipe 12 is displaceably retained in a covering unit 104 in the longitudinal direction L, that is to say, the longitudinal adjustment direction, wherein the longitudinal direction L extends in an axial direction of the steering spindle 14. As a result of an adjustment of the covering pipe 12 with respect to the covering unit 104, a longitudinal adjustment of the steering spindle 14 and consequently of the steering wheel which is not illustrated in order to adapt the position of the steering wheel to the seating position of a driver of the motor vehicle can accordingly be achieved.

The covering unit 104 is pivotably secured to a console 100 and can be pivoted about a pivot axis 106 relative to the console 100. An adjustability of the adjustment unit 16 in a vertical direction H, that is to say, the vertical adjustment direction, which is orientated substantially perpendicularly to the longitudinal direction L, is enabled by the covering pipe 12 being retained on the console 100 by means of a pivot mechanism 18. A pivot-ability of the covering pipe 12 and the steering spindle 14 is thus achieved with respect to the carrier unit 10 and in particular with respect to the console 100 about the pivot axis 106 in such a manner that a vertical adjustment of the steering wheel which is not shown here and which is arranged on the steering spindle 14 is achieved in order in this manner to also achieve an adaptation of the position of the steering wheel to the seating position of the driver.

In the embodiment, there is for each of the two adjustment devices a separate adjustment drive 2, 2', each having a separate spindle drive, comprising a threaded spindle 4, 4' and a spindle nut 3.

There is provided an adjustment drive 2, by means of which an adjustment of the adjustment unit 16 with respect to the carrier unit 10 in the longitudinal direction L can be achieved. The adjustment drive 2 comprises a threaded spindle 4 which has an outer thread 42 and which is connected by means of a securing element 107 which is constructed as a joint pin to the articulated lever 120 which is connected to the covering pipe 12. The articulated lever 120 is displaceably guided in a slot 110 in the covering unit 104 in such a manner that a displacement of the articulated lever 120 with respect to the covering unit 104 leads to a displacement of the adjustment unit 16 with respect to the carrier unit 10 in the longitudinal direction L.

The threaded spindle 4 is retained on the articulated lever 120 by means of a coupling element 6, which is also referred to as a connection element 6 and which is constructed as a joint head 43 and extends with the spindle axis S thereof in the longitudinal direction L. The threaded spindle 4 is retained in a spindle nut 3 which has an inner thread 32 which is in engagement with the outer thread 42 of the threaded spindle 4. The spindle nut 3 is supported rotatably, but in a fixed manner in the longitudinal direction L with respect to the covering unit 104 in a gear housing 34 so that a rotation of the spindle nut 3 as a result of the thread engagement with the threaded spindle 4 leads to an axial movement of the threaded spindle 4 relative to the spindle nut 3 in the direction of the spindle axis S. That is to say, as a result of a rotation of the spindle nut 3, a relative movement between the covering pipe 12 and covering unit 104 takes place in such a manner that an adjustment of the position of the adjustment unit 16 with respect to the carrier unit 10 is brought about by the rotation of the spindle nut 3.

Figure 4:
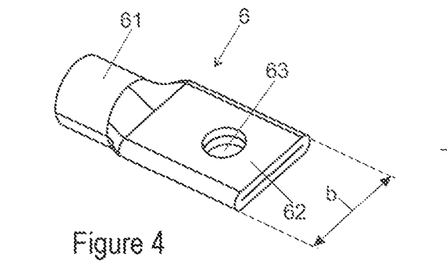
FIG. 4 is a perspective view of a coupling element.

The adjustment drive 2 further comprises a drive motor 20, on the output shaft 24 of which a worm 22 which can be clearly seen in FIG. 4 is arranged. The worm 22 engages in an outer tooth arrangement 30 of the spindle nut 3, wherein the outer tooth arrangement 30 is constructed as a worm gear. The spindle nut 3 is rotatably supported in a bearing 33 in the gear housing 34 about the spindle axis S. The rotation axis of the worm 22 and the spindle axis S of the spindle nut 3 are located perpendicularly to each other, as known per se with worm gears.

Accordingly, as a result of a rotation of the output shaft 24 of the drive motor 20, the spindle nut 3 can be rotated, whereby a longitudinal adjustment of the adjustment unit 16 in the longitudinal direction L with respect to the covering unit 104 and consequently a longitudinal displacement of the adjustment unit 16 with respect to the carrier unit 10 takes place.

Figure 2:
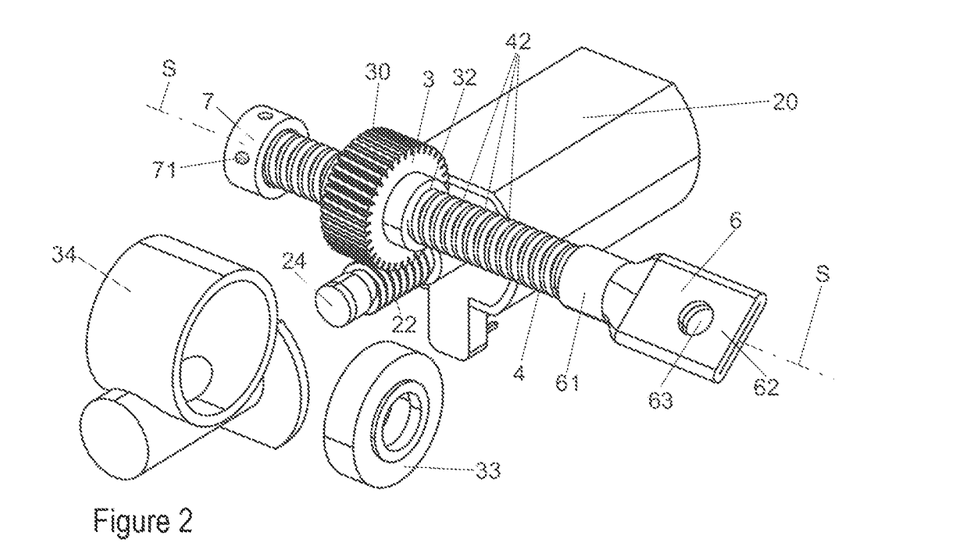
FIG. 2 is an exploded view of an adjustment drive of the steering column according to FIG. 1.

FIG. 2 is a broken-apart illustration of the adjustment drive 2. It is possible to clearly see the threaded spindle 4, at one end of which the coupling element 6 is securely fitted. At the other end, a stop element 7 which is formed from plastics material is securely fitted to the threaded spindle 4, wherein the stop element 7 is fixed to the threaded spindle 4 by means of partial plastic deformations in the form of indentations 71 which are introduced by means of hot- or warm-caulking. Alternatively, the stop element 7 may also be formed from a metal material which is fixed by means of partial plastic deformations to the threaded spindle.

Figure 3:
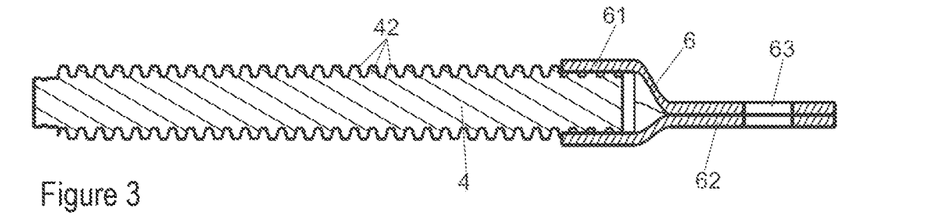
FIG. 3 is a longitudinal section through a threaded spindle.

The threaded spindle 4 is shown in FIG. 3 in longitudinal section. It can be seen therein how the coupling element (connection element) 6 is secured to the thread 42.

Figure 5:
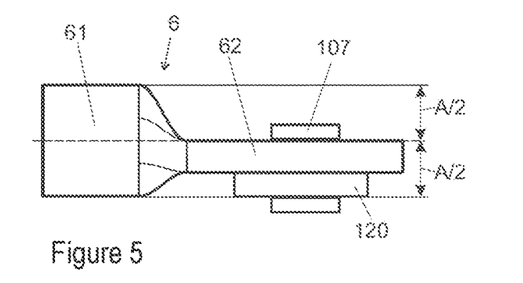
FIG. 5 is a side view of the coupling element according to FIG. 4 in the mounted state on a steering column according to FIG. 1.

A coupling element (connection element) 6 according to the invention is initially produced as a separate component, as shown in FIG. 4 in detail. This is illustrated in FIG. 5 in the assembled state and in FIG. 6 as a longitudinal section.

The coupling element (connection element) 6 has a receiving portion 61 and a coupling portion which is constructed as a pressing portion 62.

The receiving portion 61 is constructed in a sleeve-like, hollow-cylindrical manner with a circular cross-section, which extends along the spindle axis S, having a circular-cylindrical outer diameter A, an opening having a circular-cylindrical inner diameter a and a wall thickness w (pipe wall thickness).

The coupling portion is formed by a pressing portion 62 in which a pipe portion with the original cross-section of the receiving portion 61 is compressed flat, that is to say, shaped flat by the application of surface pressure in a pressing direction perpendicularly to the spindle axis S, as indicated with the arrows P. As a result of the plastic deformation which has been carried out, the walls now lie in a planar manner against each other in the contact plane K, which is located parallel with the axis S. In the example shown, the pressing portion 62 has a thickness $2w$, that is to say, double the wall thickness w and perpendicular thereto a width b which is greater than the outer diameter A.

According to the invention, the threaded spindle 4 extends only inside the receiving portion 61 and not in the pressing portion 62. The pressing portion 62 is thereby formed only by the flat-compressed walls of the pipe portion.

A connection means comprises an opening 63 which extends through the pressing portion 62 perpendicularly to the contact plane K and through which in order to connect to the articulated lever 120 a securing element 107 is guided, as shown in FIG. 5, for example, a joint pin.

Figure 6:
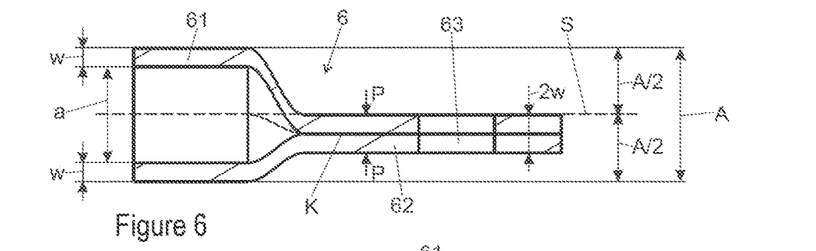
FIG. 6 is a longitudinal section through the coupling element according to FIG. 4.

As can be seen in FIG. 6, the axis S is located on the upper side of the pressing portion 62 and thus has a spacing according to the wall thickness w with respect to the contact plane k.

Figure 7:
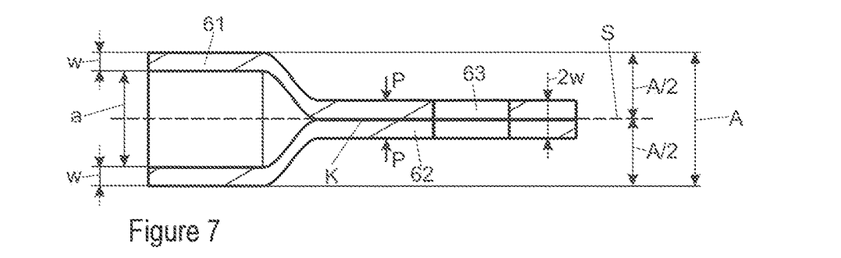
FIG. 7 is a longitudinal section through a second embodiment of a coupling element in a view as in FIG. 4.

A second alternative is as shown in the view of FIG. 6 in FIG. 7. In this symmetrical embodiment, the axis S extends in the contact plane K between the mutually adjacent walls of the pressing portion 62 which forms the coupling portion.

Figure 8:
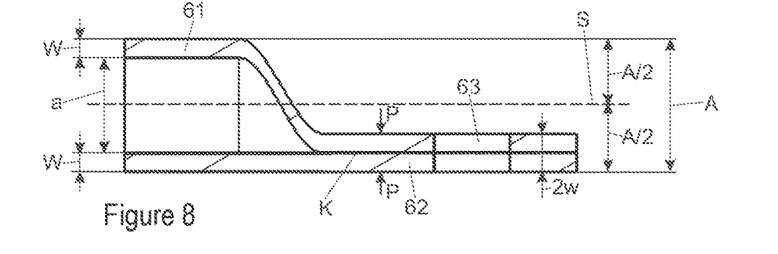
FIG. 8 is a longitudinal section through a third embodiment of a coupling element in a view as in FIG. 4.

A third alternative is as shown in the view of FIG. 6 in FIG. 8. In this instance, the pressing portion 62 extends tangentially with respect to the receiving portion 61 so that it is in alignment in the direction of the axis S with the outer periphery of the receiving portion 61.

Figure 9:
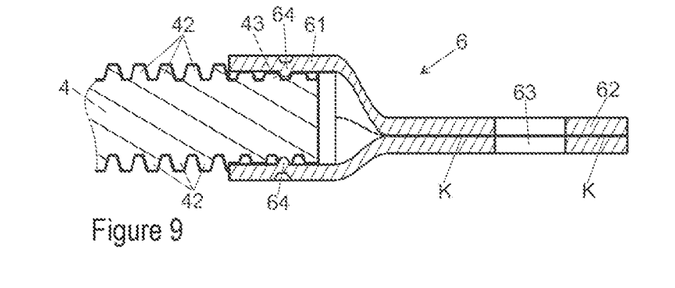
FIG. 9 is an enlarged detailed sectioned view according to FIG. 3.

FIG. 9 shows as a longitudinal section a detailed view of the threaded spindle 4 as in FIG. 4, of how the coupled element 6 can be secured to the end of the threaded spindle 4. In this instance, the receiving portion 61 is pressed with the opening thereof in the direction of the spindle axis S with the end face onto the outer thread 42. As a result of the fact that the inner diameter a of the opening is of the same size as or smaller than the outer diameter of the outer thread 42, a non-positive-locking connection is produced during the pressing action.

In addition, the receiving portion 61 may have plastic deformations, that is to say, may have moldings 64 pressed in from the outer side, in which the wall in a radially inward direction is plastically pressed radially into the outer thread 42, whereby a plastic deformation 43 occurs in each case in the outer thread 42 as a negative shape impression. A deformation 43 receives in each case a radially inwardly projecting molding 64 with respect to rotation about the spindle axis S and also with respect to the axial direction of the spindle axis S in a positive-locking manner. The inner diameter a of the opening of the receiving portion 61 is preferably of the same size as or larger than the outer diameter of the outer thread 42, and is connected to each other by means of the plastic deformation. This positive-locking connection between the receiving portion 61 and the threaded spindle 4 is, as a result of the plastic deformation which has been carried out together, substantially play-free and particularly durable and resilient.

Figure 10:
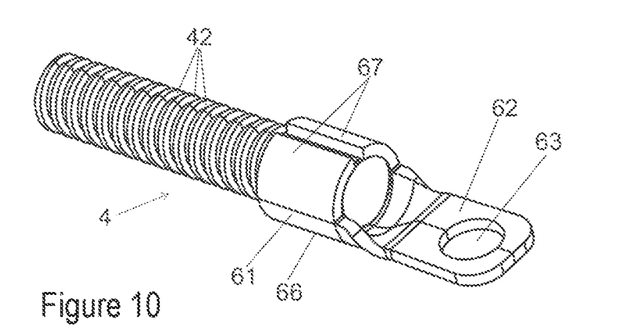
FIG. 10 is a schematic, perspective view of a threaded spindle with a coupling element in a second embodiment.
Figure 11:
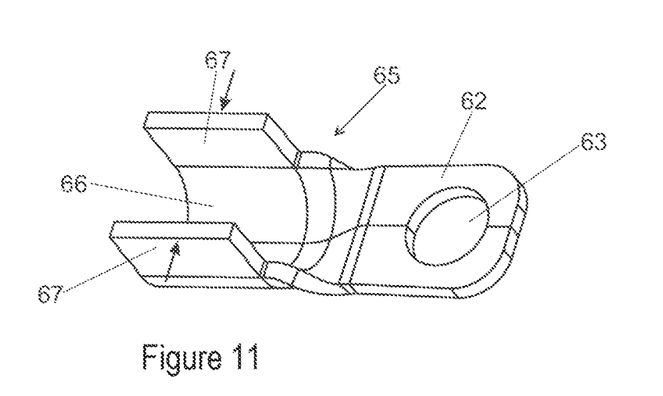
FIG. 11 is a schematic, perspective view of a coupling element in the second embodiment prior to the assembly.

FIGS. 10 and 11 show a second embodiment of a coupling element 6. FIG. 11 shows the state prior to the assembly which is illustrated in FIG. 10.

FIG. 11 shows a sheet portion 65 which has been preformed from an initially planar metal sheet. This has a flat coupling portion which corresponds to the pressing portion 62. The receiving portion 61 is preformed in the form of an open channel 66, from the edges of which two securing lugs 67 protrude transversely. A free access to the channel 66 remains between the two securing lugs 67 transversely relative to the longitudinal extent.

For connection, the thread portion 40 is placed in the channel 66 and, subsequently, the free ends of the securing lugs 67 are bent over with respect to each other, as indicated with the arrows in FIG. 11. As a result, the outer thread 42 is surrounded by the pipe portion formed by the channel 66 and the bent-over securing lugs 67, that is to say, the tubular receiving portion 61. The receiving portion 61 is fixed by means of crimping by means of plastic compression from the outer side onto the outer thread 42 of the threaded spindle 4.

Figure 12:
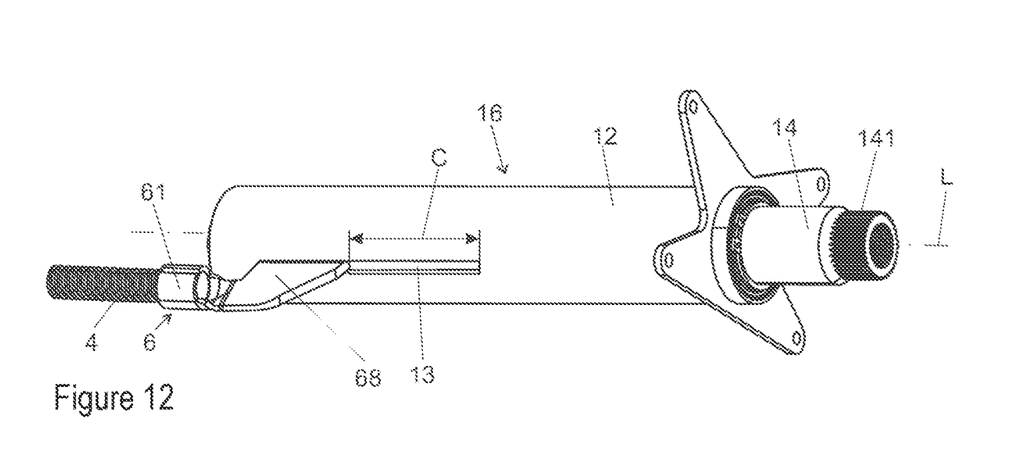
FIG. 12 is a schematic, perspective view of a third embodiment of a coupling element.

FIG. 12 shows another embodiment of a coupling element 6 according to the invention in which an expansion element 68 is formed integrally on the tubular receiving portion 61. The expansion element 68 is introduced in a crash slot 13 in the covering pipe 12 which has a length C.

The expansion element 68 is oversized compared with the crash slot 13 and is thus wider than the slot opening. In the event of a crash, the expansion element 68 is thus moved in the arrow direction over a crash path of the length C with plastic expansion by the slot 13, whereby kinetic crash energy is continuously absorbed.

LIST OF REFERENCE NUMERALS

1 Steering column
10 Carrier unit
12 Covering pipe
13 Crash slot
14 Steering spindle
141 Steering-wheel-side end
16 Adjustment unit
18 Pivot mechanism
100 Console
102 Securing hole
104 Covering unit
106 Pivot axis
107 Securing element
110 Slot
120 Articulated lever
181 Actuation lever
182 Joint
183 Joint axis
184 Joint axis
2, Z Adjustment drive
20, 20' Drive motor
22 Worm
24 Output shaft
3 Spindle nut
30 Outer tooth arrangement
32 Inner thread
321 Thread turn
322 Thread flanks
323 Indentation
33 Bearing
34 Gear housing
4, 4' Threaded spindle
40 Thread portion
42 Outer thread
43 Molding
6 Coupling element (connection element)
61 Receiving portion (pipe portion)
62 Pressing portion (coupling portion)
63 Opening
64 Molding
65 Sheet portion
66 Channel
67 Securing lug
68 Expansion element
L Longitudinal direction
H Vertical direction
S Spindle axis
a Inner diameter of the opening of the receiving portion 61
A Outer diameter of the receiving portion 61
D Nominal diameter of the threaded spindle 4
K Contact plane
b Width
w Wall thickness
C Length of crash slot 13

What is claimed is:

1. A threaded spindle for a spindle drive, the threaded spindle comprising an outer thread, and
a coupling element, comprising:
a coupling portion, and
a receiving portion which is formed integrally with the coupling portion,
wherein the receiving portion extends in a hollow-cylindrical manner along an axis having an axial receiving opening in which a securing portion of the threaded spindle is coaxially received and the coupling portion is flattened transversely with respect to the axis relative to the receiving portion and has a connection means,
wherein the receiving portion and the coupling portion are formed from a continuous, integral pipe portion, and wherein the receiving portion has a plastic deformation which is connected in a positive-locking manner to a plastic deformation of the threaded spindle, and
wherein the coupling portion has a pressing portion in which the pipe portion is plastically compressed flat transversely relative to the axis.

2. A spindle drive for adjusting a steering column, comprising:
a rotatably drivable spindle nut, in which there engages the threaded spindle of claim 1, the threaded spindle having an outer thread and to which there is secured the coupling element.

3. A threaded spindle for a spindle drive, the threaded spindle comprising an outer thread, and
a coupling element, comprising:

a coupling portion, and a receiving portion which is formed integrally with the coupling portion, wherein the receiving portion extends in a hollow-cylindrical manner along an axis having an axial receiving opening in which a securing portion of the threaded spindle is coaxially received, and the coupling portion is flattened transversely with respect to the axis relative to the receiving portion and has a connection means, wherein the receiving portion and the coupling portion are formed from a continuous, integral metal sheet portion, and wherein the receiving portion has a pipe portion in which the metal sheet portion is bent over in a tubular manner about the axis around the threaded spindle and is connected to the threaded spindle, and wherein the receiving portion is crimped on the outer thread.

* * * * *